US011619837B2

(12) United States Patent
Chanda et al.

(10) Patent No.: US 11,619,837 B2
(45) Date of Patent: Apr. 4, 2023

(54) ACTIVE IR CAMOUFLAGE DEVICE, PLASMONIC SYSTEM, AND RELATED METHODS

(71) Applicant: UNIVERSITY OF CENTRAL FLORIDA RESEARCH FOUNDATION, INC., Orlando, FL (US)

(72) Inventors: Debashis Chanda, Oviedo, FL (US); Sayan Chandra, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 602 days.

(21) Appl. No.: 16/811,250

(22) Filed: Mar. 6, 2020

(65) Prior Publication Data
US 2020/0285082 A1 Sep. 10, 2020

Related U.S. Application Data

(60) Provisional application No. 62/814,368, filed on Mar. 6, 2019.

(51) Int. Cl.
G02F 1/01 (2006.01)
G02F 1/1524 (2019.01)
F41H 3/00 (2006.01)
G02F 1/21 (2006.01)
H01Q 17/00 (2006.01)

(52) U.S. Cl.
CPC .............. G02F 1/0147 (2013.01); F41H 3/00 (2013.01); G02F 1/1524 (2019.01); G02F 1/213 (2021.01); G02F 2202/09 (2013.01); G02F 2202/10 (2013.01); G02F 2203/10 (2013.01); H01Q 17/005 (2013.01)

(58) Field of Classification Search
CPC .............. H01Q 17/005; G02F 2203/10; G02F 2202/10; G02F 2202/09; G02F 1/213; G02F 1/1524; G02F 1/0147; F41H 3/00
See application file for complete search history.

(56) References Cited

U.S. PATENT DOCUMENTS

| 4,495,239 | A | 1/1985 | Pusch et al. |
| 6,338,292 | B1 | 1/2002 | Reynolds et al. |
| 10,556,192 | B2 | 2/2020 | Parker et al. |
| 10,560,814 | B2 | 2/2020 | Monnes et al. |

(Continued)

Primary Examiner — Mariam Qureshi
(74) Attorney, Agent, or Firm — Allen, Dyer, Doppelt + Gilchrist, PA

(57) ABSTRACT

An active IR camouflage device may include a base layer, a first dielectric layer over the base layer, a phase transition material layer over the first dielectric layer, a second dielectric layer over the phase transition material layer, and a first metal layer over the second dielectric layer and defining a pattern of openings therein. The active IR camouflage device may have circuitry configured to selectively cause a transition from a first phase state to a second phase state of the phase transition material layer to control IR reflectance/emission of a top plasmonic layer, making it appear/disappear from the IR detector/camera. In some embodiments, the active IR camouflage device may also include a second metal layer between the base layer and the first dielectric layer.

23 Claims, 16 Drawing Sheets

(56) References Cited

U.S. PATENT DOCUMENTS

| | | | |
|---|---|---|---|
| 2005/0118402 A1* | 6/2005 | Henderson | F41H 3/00 |
| | | | 428/209 |
| 2013/0137324 A1 | 5/2013 | Tang | |
| 2014/0247478 A1 | 9/2014 | Bates et al. | |
| 2018/0297058 A1 | 10/2018 | Gorodetsky et al. | |
| 2020/0033644 A1* | 1/2020 | Bhaskaran | G02F 1/0147 |

* cited by examiner

ACTIVE IR CAMOUFLAGE DEVICE, PLASMONIC SYSTEM, AND RELATED METHODS

RELATED APPLICATION

This application is based upon prior filed Application No. 62/814,368 filed Mar. 6, 2019, the entire subject matter of which is incorporated herein by reference in its entirety.

TECHNICAL FIELD

The present disclosure relates to the field of electronic devices, and, more particularly, to an infrared radiation system and related methods.

BACKGROUND

Thermal imaging is a useful tool for providing additional information to typical visible radiation image systems. Thermographic cameras usually detect radiation in the long-infrared range of the electromagnetic spectrum (roughly 8-14 µm) and produce images of that radiation, called thermograms. In the last few decades, thermal imaging devices have become fairly common in commercial and industrial applications. Indeed, typical visible radiation image sensors tend to include some sensitivity in the near-infrared (NIR) spectrum. In some applications, it may be helpful to manage the thermograph visibility of an object.

Thermal management has increasingly become an integral part of the modern society with applications in the automotive industry,[1] housing,[3] surveillance,[4] and medicine[5] etc. Most applications require infrared (IR) detection in the 3-5 µm and 8-12 µm bands, which are IR transparent in Earth's atmosphere. Typically, some IR detectors[6] [7] [8] offer detection in the range of $\sim 10^9$-$10^{10}$ Jones and are capable of resolving milli-kelvin differences in temperature.

SUMMARY

The proposed active IR camouflage device may include a base layer, a first dielectric layer over the base layer, a phase transition material layer over the first dielectric layer, a second dielectric layer over the phase transition material layer, and a first metal layer over the second dielectric layer and defining a pattern of openings therein. The active IR camouflage device may comprise circuitry configured to selectively cause a transition from a first phase state to a second phase state of the phase transition material layer to control IR reflectance/emission from a top plasmonic layer. In some embodiments, the active IR camouflage device may also include a second metal layer between the base layer and the first dielectric layer.

Advantageously, the circuitry of active IR camouflage device may selectively camouflage its IR profile from external detector/cameras. The circuitry causes this camouflage effect by manipulating the phase state of the phase transition material layer.

More specifically, the first metal layer may comprise an upper layer, and a lower layer adjacent the second dielectric layer, and the pattern of openings may include a plurality of openings in the upper layer, and a plurality of discs in the lower layer. The plurality of openings may be aligned to respectively overlap the plurality of discs. The first phase state may comprise a semiconductor state, and the second phase state may comprise a metal phase state.

Also, when the phase transition material layer is in the first phase state (i.e. semiconducting), the first dielectric layer, the phase transition material layer, the second dielectric layer, and the first metal layer may define an optical cavity. When the phase transition material layer is in the second phase state (i.e. metallic), the second dielectric layer, and the first metal layer may define the optical cavity, i.e. the phase transition material layer defines a lower metallic boundary of the optical cavity.

The base layer may comprise a glass layer, for example. The phase transition material layer may comprise vanadium dioxide. The first metal layer may comprise at least one of gold, silver, aluminum, and an electrically conductive material.

Another aspect is directed to a plasmonic system with tunable cavity length operating in an IR frequency spectrum. The plasmonic system may include a base layer, a first dielectric layer over the base layer, a phase transition material layer over the first dielectric layer, and a second dielectric layer over the phase transition material layer. The plasmonic system may include a first metal layer over the second dielectric layer and defining a pattern of openings therein, and circuitry configured to selectively cause a transition from a first phase state to a second phase state of the phase transition material layer to control IR reflectance based upon the tunable cavity length.

Another aspect is directed to a method for making an active IR camouflage device. The method may comprise forming a first dielectric layer over a base layer, forming a phase transition material layer over the first dielectric layer, and forming a second dielectric layer over the phase transition material layer. The method may include forming a first metal layer over the second dielectric layer. The first metal layer may define a pattern of openings therein. The method may include coupling circuitry to selectively cause a transition from a first phase state to a second phase state of the phase transition material layer to control IR reflectance of the phase transition material layer.

Yet another is directed to a method for operating an IR camouflage device. The IR camouflage device may have a base layer, a first dielectric layer over the base layer, a phase transition material layer over the first dielectric layer, a second dielectric layer over the phase transition material layer, and a first metal layer over the second dielectric layer and defining a pattern of openings therein. The method may include operating circuitry to selectively cause a transition from a first phase state to a second phase state of the phase transition material layer to control IR reflectance of the phase transition material layer.

DETAILED DESCRIPTION

Figure 1A:
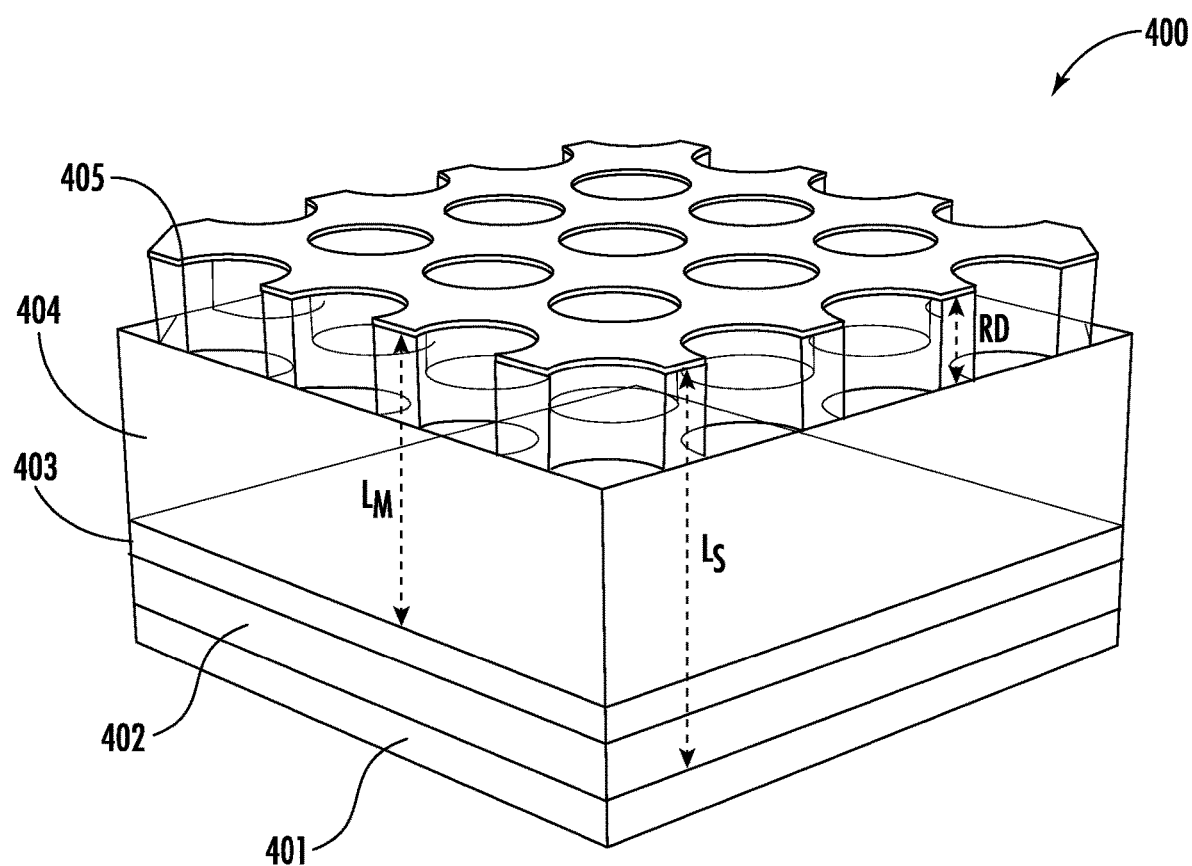
FIG. 1A is a schematic perspective view of a plasmonic system with tunable cavity length, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Current microbolometer pixel sizes of sub 20 μm provide excellent spatial resolution for detectors, however similarly pixelated, spectrally selective surfaces with encoded IR information that can be adaptively camouflaged upon actuation have not been realized. Some approaches for adaptive IR camouflage are based on thin films or nanostructured polymers that modulate emission or reflection by using thermochromic materials[9][10] or manipulate the diffractive properties of electrochromic[11] surfaces. However, they generally exhibit a change in optical response across a wavelength range without any spectral selectivity that is necessary for technological advancements in IR tagging, camouflaging and anti-counterfeiting efforts.[12][13] Although previous studies[14][15][16] have demonstrated emission control to certain extent, which is limited in terms of cycle-ability, response time, actuation mechanism, stability etc., one of the issues that has not been addressed so far is the spatial density of IR information that can be encoded and actively manipulated for camouflaging.

A hybrid electro-optical or thermo-optical system may be used to achieve adaptive camouflage with spectral selectivity. It may constitute (i) an adaptive material that can be actuated to trigger camouflage, and (ii) an optical component that can be tuned to operate at a desired wavelength, thereby enabling the multispectral aspect[17]. Choice of an adaptive material is determined by the actuation mechanism, for example, electroactive polymers change shape and surface area upon application of an external electric field,[16] whereas, thermochromic materials like $VO_2$[18] or $Ge_3Sb_2Te_6$ (GST)[19] exhibit changes in optical properties when thermally driven past their phase transition temperatures. Electroactive material or elastomer based systems rely on changes in their physical dimension, which inherently introduces problems, such as slow response time, inability to locally control dimension for pixelation and need for extremely high voltages[16] (~kV) to initiate actuation.

Furthermore, a potential disadvantage in such systems is the low cycle-ability of less than 1000 which limits their viability for real life applications.[20][16] Electrochromic polymer based systems offer poor spectral selectivity and lack chemical stability unless maintained in an inert medium.[21][11] In other approaches, GST has been used as the adaptive material where the optical properties were modulated as the material underwent an amorphous to crystalline phase transition[22] at temperatures>433 K. High and broad transition (20-30 K) temperatures, susceptibility of GST alloys to heat induced oxidation and poor cycle-ability of <50 makes them less attractive for these applications.[19] Considering the above factors, $VO_2$, a material that undergoes a thermally induced ultrafast (few nanoseconds), sharp (5-8 K) semiconductor-metal transition (SMT) at 340 K associated with orders of magnitude change in resistivity, stands out as a promising material for adaptive IR operation.[23][24][25][26] In addition, $VO_2$ can be cycled over $10^6$ times without any degradation in the SMT behavior.[27][28][29] Combining these exceptional properties of $VO_2$ with an imprinted plasmonic surface[30] that can be engineered to exhibit localized surface plasmon resonances (LSPR) at any desired operating wavelength forms the platform of this work.

Applicant introduces a multilayered cavity-coupled plasmonic system that can be designed to operate at a given wavelength in the Midwave IR (MWIR) and longwave (LWIR) bands. First, the operating principle of the system is discussed for an arbitrarily chosen surface where the SMT driven changes in the complex permittivity of $VO_2$ are modelled using effective medium theory to describe the temperature dependent optical response. The phase transition induced change in $VO_2$ permittivity drastically alters the IR resonance of the cavity coupled plasmonic system by switching the effective cavity thickness. Later, the device parameters are tailored to demonstrate adaptive camouflage of encoded IR information on a pixelated surface.

Figure 1B:
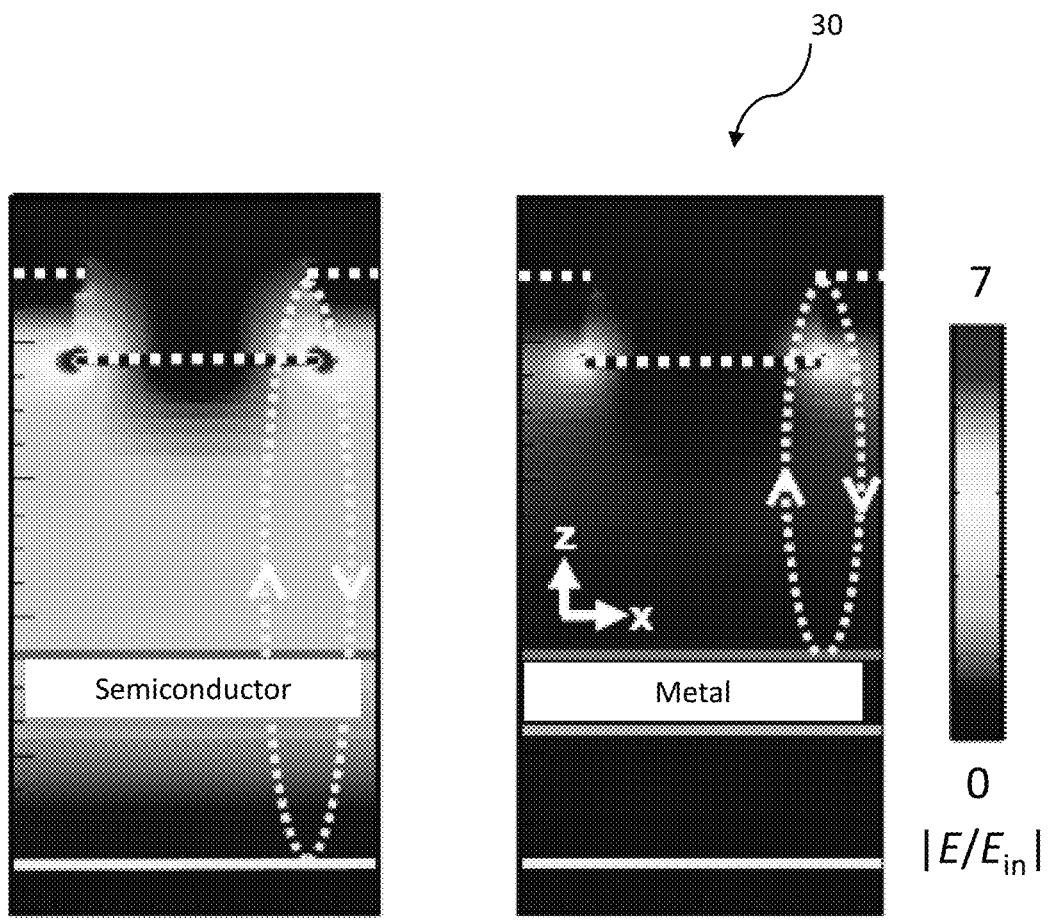
FIG. 1B is a diagram of finite-difference time-domain (FDTD) simulated cross-sectional electric field profile at respective fundamental resonance wavelengths in the semiconducting (left) and metallic (right) states of $VO_2$.
Figure 2A:
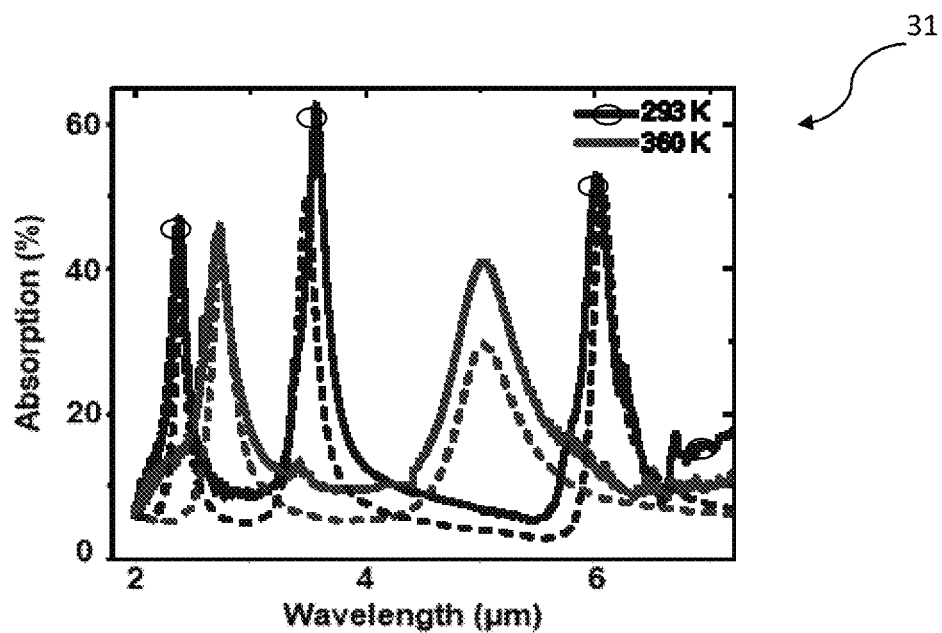
FIGS. 2A-2D are diagrams, respectively, of measured and FDTD simulated spectra, measured absorption as a function of temperature, a FDTD simulation for calculating absorption using a Maxwell Garnett effective medium model, and a FDTD simulation for calculating absorption using a Bruggeman effective medium model.

FIG. 1A illustrates the cavity coupled absorber architecture 400 comprising a complementary gold hole/disk array 405, a tri-layered cavity spacer and a reflective back mirror 401. The tri-layered cavity spacer comprises of a layer of SiO$_2$ 402, VO$_2$ 403 and a polymer 404 that can be imprinted upon to form the top hole/disk array 405. The design includes a square array of gold nanodisk that is separated from its complementary gold nanohole array (perforated gold film) by the relief depth (RD) of the structure. Depending on the phase of the VO$_2$ layer, the cavity length changes from L$_S$ in its semiconducting state to L$_M$ in the metallic state. This can be visualized from the electric field profiles of the absorber obtained by performing finite difference time domain (FDTD) simulations as shown in FIG. 1B (diagram 30), where solid lines show the location of mirror (rectangle marked), SiO$_2$ (triangle marked), VO$_2$ (oval marked) layers. Hole and disk are marked by white dashed lines. In the simulations, parameters such as RD, period and hole diameter for the square array were set to 380 nm, 740 nm and 540 nm respectively. The optical constants of VO$_2$ in the semiconducting and metallic states were obtained from previous reports.[31] [32] The thickness of SiO$_2$, VO$_2$ and SU-8 layers were set at 200 nm, 150 nm and 1350 nm respectively. FIG. 2A (diagram 31: measured and FDTD simulated spectra are shown in solid and dashed lines, respectively) compares the FDTD predicted and experimentally measured absorption spectra for the two states of VO$_2$. In both the semiconducting and metallic states, Applicant observes the characteristic fundamental Fabry-Perot assisted localized surface plasmon resonances known as hybrid plasmon[33] [30] and their higher orders. FIG. 1B compares the electric field profiles of the absorber at the respective fundamental resonance wavelengths of 6.3 μm in the semiconducting state and 5.2 μm in the metallic state. As indicated, the cavity length shortens by almost the sum of the VO$_2$ and SiO$_2$ layer thicknesses which triggers a spectral red shift of ~1.5 μm in the fundamental resonance modes as the VO$_2$ layer undergoes a phase transition from semiconductor to reflective metal.

Figure 2B:
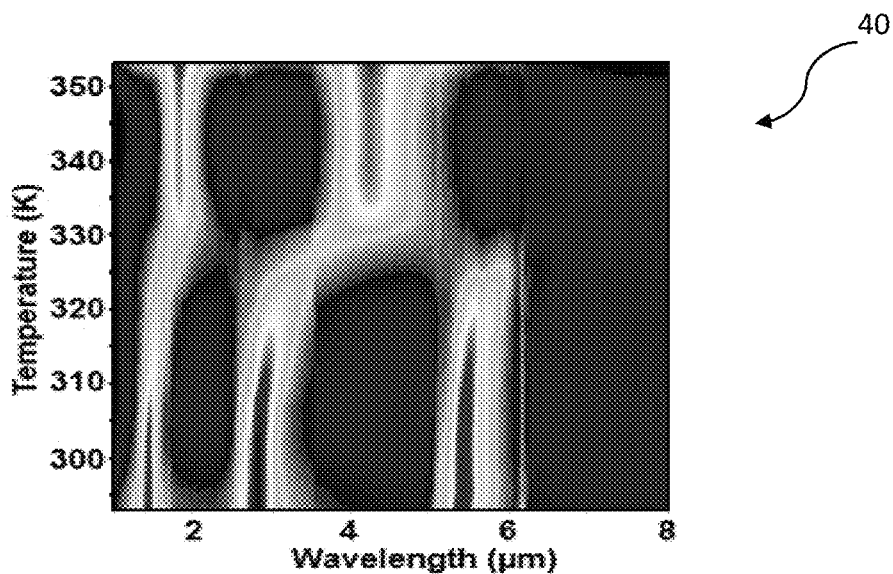

In order to experimentally validate the FDTD simulations, it was imperative to deposit high quality VO$_2$ films that exhibit sharp semiconductor (S)—metal (M) transition associated with narrow thermal hysteresis. While the optical constants used for the simulations were extracted from single crystalline VO$_2$, they adequately describe the optical behavior of the deposited polycrystalline films. The agreement between the experimentally measured optical spectra in the semiconducting (293 K) and metallic (360 K) states overlaid on the FDTD curves in FIG. 2A confirms the high quality of the fabricated samples. From a fundamental aspect, it is intriguing to understand the evolution of the optical properties of the complex absorber structure as a function of temperature. The absorption spectra recorded at regular temperature intervals are shown in FIG. 2B (diagram 40). As the temperature is increased from 290 K to 330 K, there is a gradual decrease along with a slight red shift in the absorption peaks. Above 330K, there is a sudden blue shift in the fundamental and second order absorption peaks as the VO$_2$ layer undergoes the S-M transition associated with increase in the metallic volume fraction. Since the surface plasmons on the disk array are excited by the Fabry-Perot modes of the cavity, decrease in the cavity length gives rise to the blue shift in LSPR. When the system temperature is further increased, the metallic volume fraction increases as seen from the intensity rise in the absorption peaks before stabilizing around 360 K. In its fully metallic state, the VO$_2$ layer behaves as a mirror to IR light and isolates the rest of the cavity and gold mirror from the optical path.

It is evident from the experimental data (FIG. 2A) that the sharp phase transition in VO$_2$ induces a sudden change in cavity length resulting in the tunable optical response. In the intermediate temperatures, the optical path length of the cavity depends on the temperature dependent permittivity of VO$_2$. Using effective medium models, the optical constants for a given phase composition, i.e. metallic fill fraction within the semiconducting matrix of VO$_2$ can be calculated.[34] Two variations of the effect medium theory (EMT), namely, the Maxwell Garnett (Eq. 1) and Bruggeman EMT (Eq. 2) were used to calculate the temperature dependent dielectric functions of VO$_2$:

$$\varepsilon_{MG}=\varepsilon_s[\{\varepsilon_m(1+2f)-\varepsilon_s(2f-2)\}/\{\varepsilon_s(2+f)+\varepsilon_m(1-f)\}] \quad (1)$$

$$\varepsilon_{BR}=\tfrac{1}{4}\{\varepsilon_s(2-3f)+\varepsilon_m(3f-1)+\sqrt{\{\varepsilon_s(2-3f)+\varepsilon_m(3f-1)\}^2+8\varepsilon_s\varepsilon_m}\} \quad (2)$$

Figure 2C:
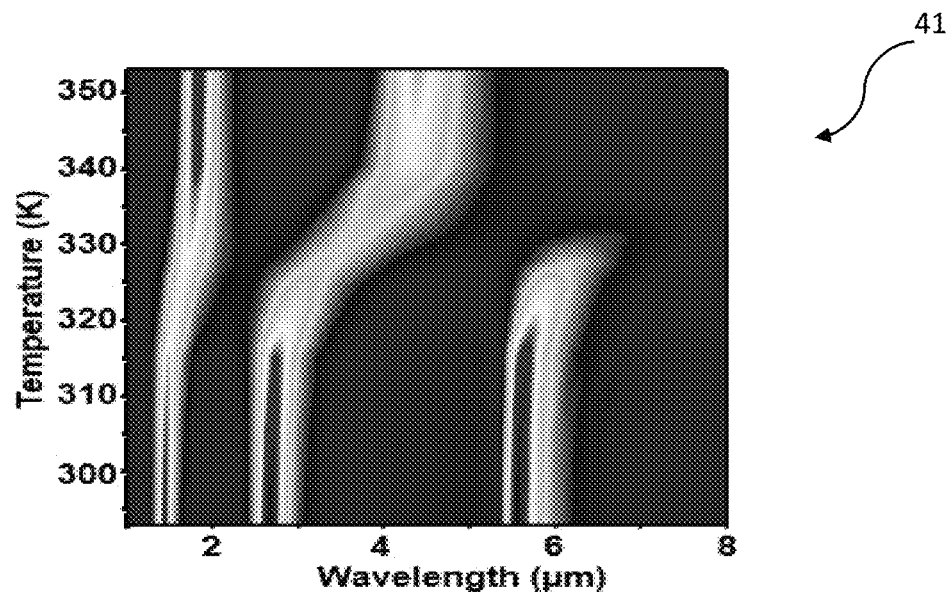
Figure 2D:
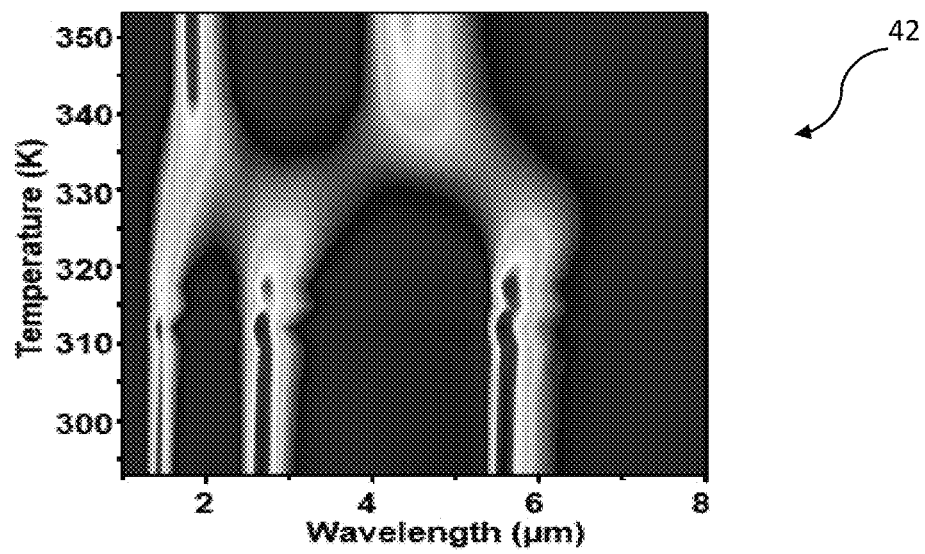

Here, $\varepsilon_s$ and $\varepsilon_m$ are the complex permittivity for the semiconducting (290 K) and metallic (360 K) states of VO$_2$ and f corresponds to the fill fraction of the metallic phase. The dispersion in the calculated permittivity values using the two EMTs show significant differences in the 2-16 μm range (FIGS. 6A-6D: diagrams 85, 90, 95, 97, real and imaginary components of VO$_2$ permittivity calculated using the Maxwell Garnett and Bruggeman effective medium models for different metallic volume percentages as indicated in the legend: 0-hexagon, 10-pentagon, 25-diamond, rectangle-50, triangle-75, oval-100). Thereafter, the calculated dielectric function were applied to perform FDTD simulations of the entire absorber stack in order to compare which EMT provides a better agreement with the experimental results. FIGS. 2C-2D (diagrams 41, 42) show the temperature dependent evolution of absorption as obtained from the Maxwell-Garnett and Bruggeman EMTs respectively. FDTD absorption for specific metal fill fraction were mapped to its corresponding temperature by fitting a Boltzmann function to the experimental resistance versus temperature curve measured while warming.[34] The transition temperature and width were used as variables for the best fit. While both EMTs are in good agreement with the experimental curves in the vicinity of the semiconducting and metallic states, they evolve differently around the phase transition at 340 K. In the temperature range of 315 K to 340 K, the Maxwell Garnett EMT models the experimentally observed phase transition better compared to the Bruggeman EMT. As the sample is heated, immediately before the S-M transition, the metallic fill fraction is ~0.1, however, with further rise in temperature, the metallic grain size increases and the percolation threshold (>0.4) is reached where the effective permittivity diverges[31]. At the percolation point, according to the Bruggeman EMT, macroscopic conductive paths develop which impacts the electrical and optical conductivity. Therefore, while the Bruggeman EMT may be applicable to interpret experiments with electrical contacts, it fails to explain the VO$_2$ permittivity for experiments that are contact free[31, 34] and essentially do not allow any charge flow as in the present study.

Figure 3A:
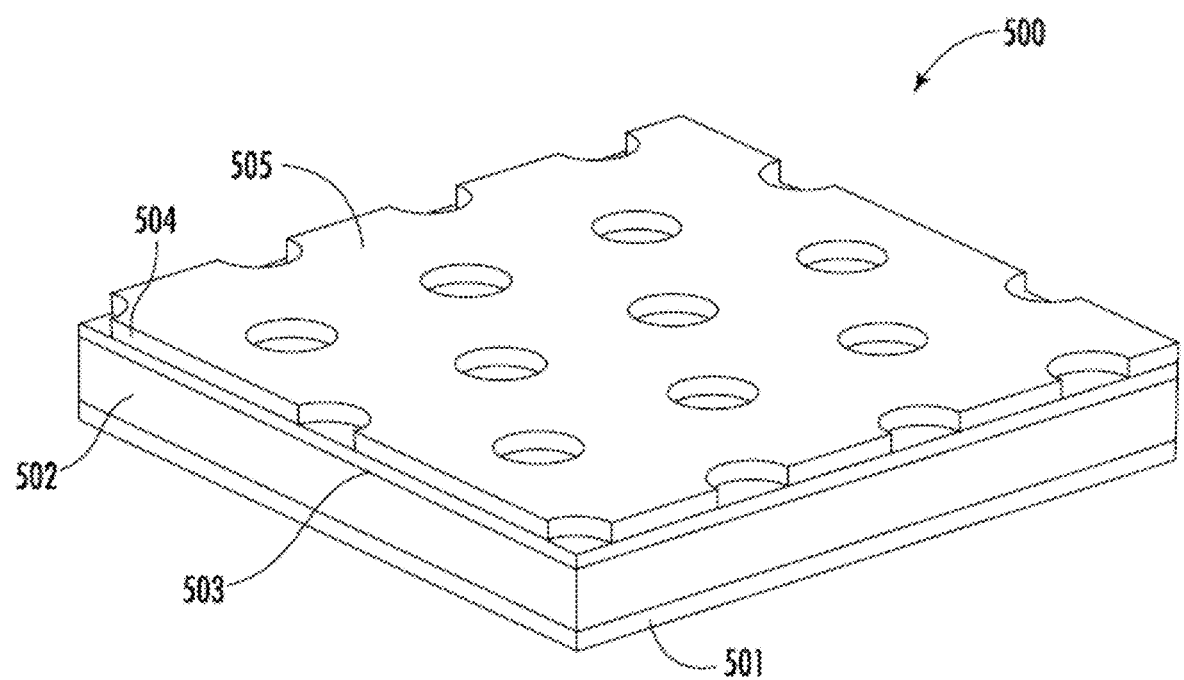
FIG. 3A is a schematic perspective view of a plasmonic device with hexagonal array of period=4 μm and diameter=1.64 μm, according to the present disclosure.

So far, the optical response of the absorber for an arbitrarily chosen plasmonic crystal pattern and cavity thickness has been investigated. As mentioned earlier, the device architecture allows for one to control the extent of cavity length tunability which is determined by the thickness of the SiO$_2$ layer. The design parameters can be optimized to achieve IR absorption at any desired wavelength. Here, shown is a similarly stacked device that has been designed to absorb light in the 8-14 μm band when the VO$_2$ layer is semiconducting. Upon heating past the S-M transition, the device behaves as a reflector. To demonstrate the versatility of the design, hexagonal array of hole and disk are chosen as the gold plasmonic pattern instead of the previously demonstrated square array. FIG. 3A shows the schematic of the device 500 with optimized parameters obtained by sweeping over period and hole diameter 505 in FDTD simulations. For given P=4 μm and D=1.64 μm, the $SiO_2$ layer 502 thickness was varied from 0-3 μm to study its effect on the device. In the semiconducting state of $VO_2$, the device 500 absorbs light in the 8-14 μm band with the fundamental cavity resonance in the vicinity of 8 μm. Note, that in the optimized device design (FIG. 3B), the SU-8 layer 504 is just 50 nm thicker than the relief depth of 380 nm which means that when $VO_2$ 503 is metallic, the effective cavity length is remarkably shortened. This device 500 illustratively includes a gold base layer 501. In this condition, no Fabry Perot modes are sustained and the device reflects about 80% light (FIG. 3C: diagram 61) almost uniformly across the band.

Figure 3B:
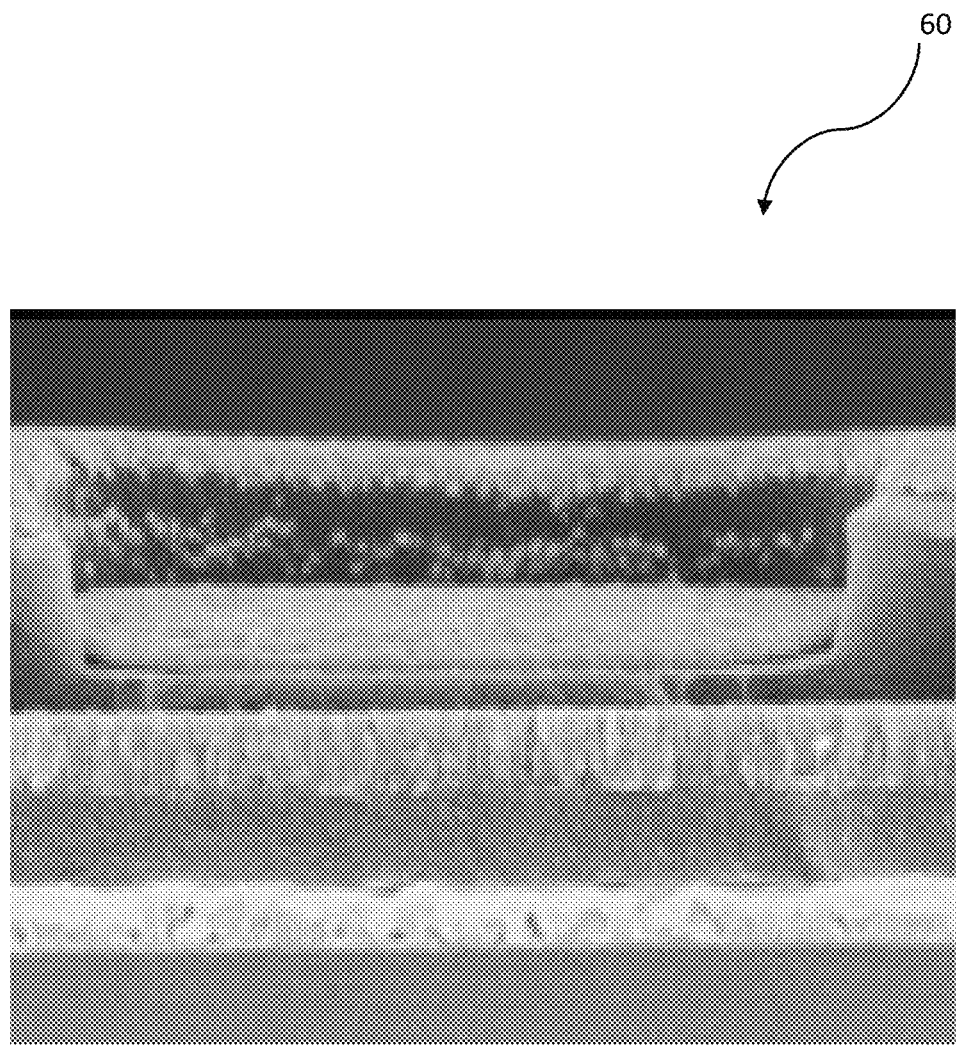
FIGS. 3B-3D are diagrams, respectively, of a cross-section scanning electron microscope image of the device of FIG. 3A, measured reflectance as a function of $SiO_2$ spacer thickness in 6-16 μm range for semiconducting and metallic states of $VO_2$, and measured spectra of two devices with different $SiO_2$ spacer thicknesses in semiconducting and metallic states.
Figure 3C:
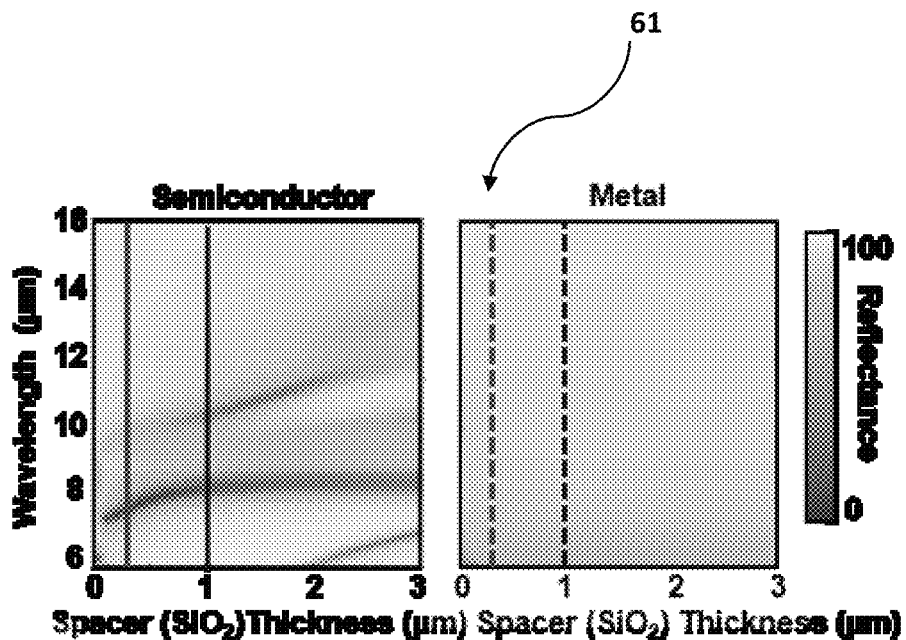
Figure 3D:
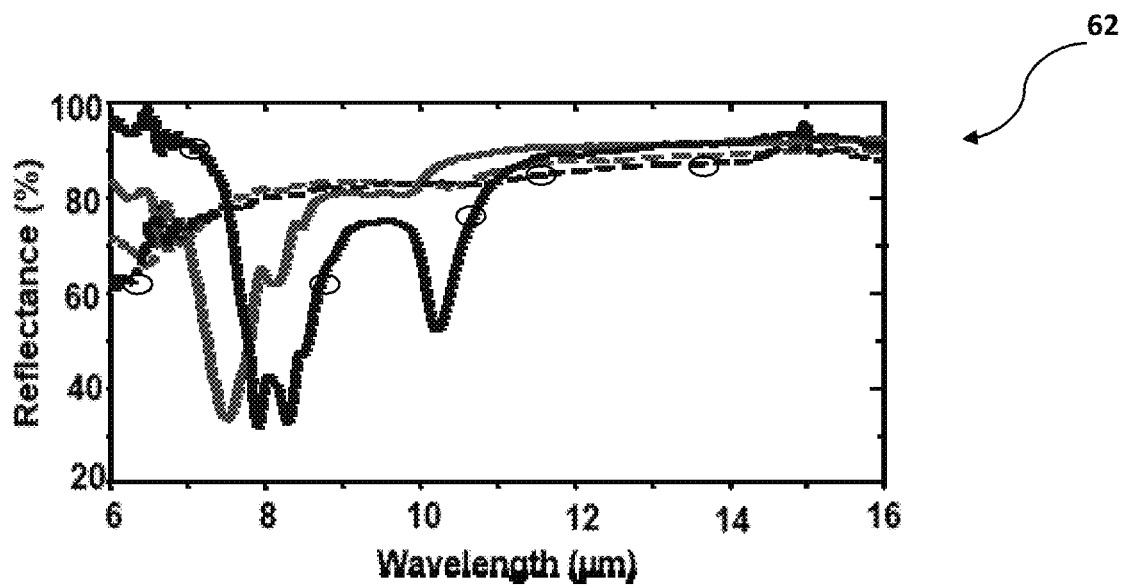

To verify the simulated results, two devices with $SiO_2$ layer thickness of 200 nm and 1000 nm were fabricated. The sub-wavelength hole/disk pattern was formed using a combination of direct laser lithography (DLW) and nanoimprint lithography (NIL). Direct laser lithography is a versatile technique to create custom patterns with sub-micron resolution. However, writing parameters are susceptible to reflectance from the substrate and therefore must be optimized for each sample. This poses a concern about reliability and throughput over several samples. To avoid this, an imprint master is created by laser writing on a photoresist (S1813, Shipley) that is spun coated on a glass slide. The laser written master is then used to make polydimethylsiloxane (PDMS) stamps that are used to transfer the pattern on Applicant's device stack by nanoimprint lithography.[35] [36] [37] Therefore, a single master made by laser lithography can be used to make stamps which in turn can be used to create several imprinted surfaces on any substrate. FIG. 3B (diagram 60) shows the cross section scanning electron micrograph of the device with 200 nm $SiO_2$ spacer layer. Constituent layers of the device can be distinctly identified without any interlayer mixing, thereby ascertaining the high quality of the device stack. The corresponding FTIR absorption spectra of the device in both semiconducting and metallic states of $VO_2$ are shown in FIG. 3D (diagram 62: measured spectra of two devices (first with no marking, second with oval marking) with different $SiO_2$ spacer thicknesses in semiconducting (solid lines) and metallic (dashed lines) states). Consistent with the FDTD results, at 293 K a single absorption peak~7.5 μm is observed which vanishes when the sample is heated to 360 K. Similar agreements between FDTD and experiment are seen for the device with 1000 nm thick $SiO_2$ spacer layer. At their respective absorption peak locations, both devices demonstrated over 45% modulation in reflected intensity.

Figure 4A:
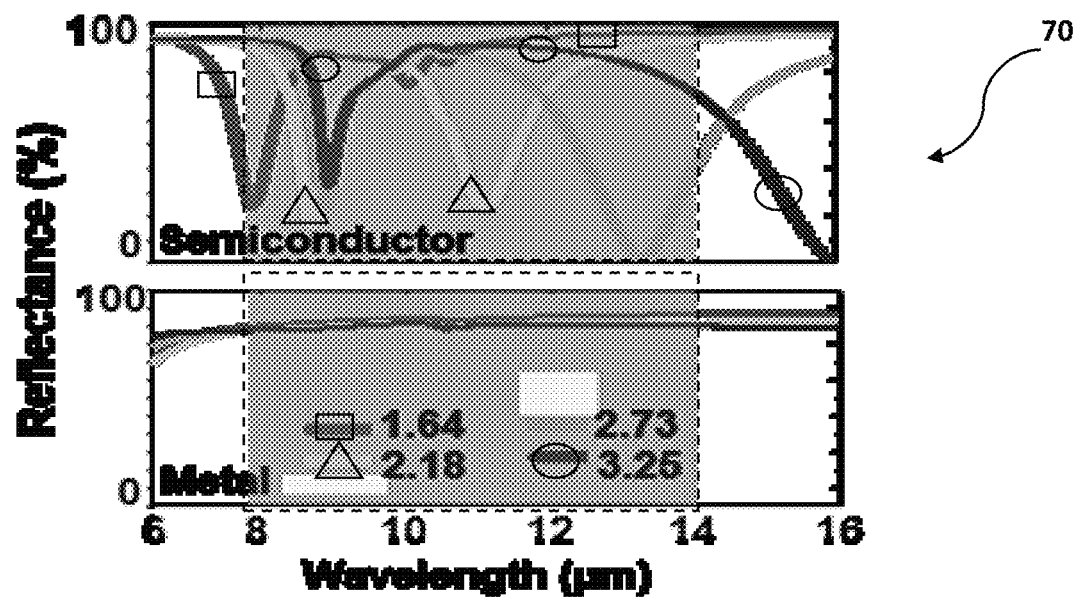
FIG. 4A a diagram of FDTD simulated spectra for different hole diameters in semiconducting and metallic states of $VO_2$, according to the present disclosure.
Figure 4B:
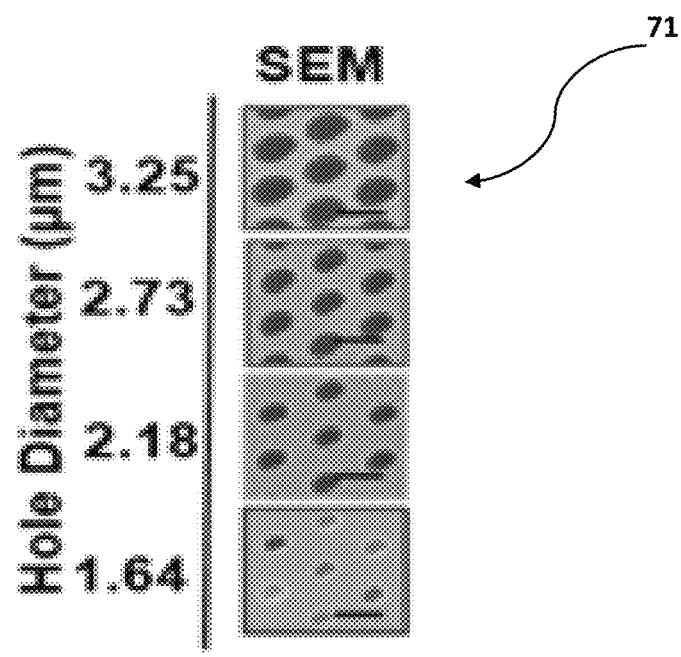
FIG. 4B is a top-view scanning electron microscope images showing the hole diameters of the fabricated plasmonic systems, according to the present disclosure.
Figure 4C:
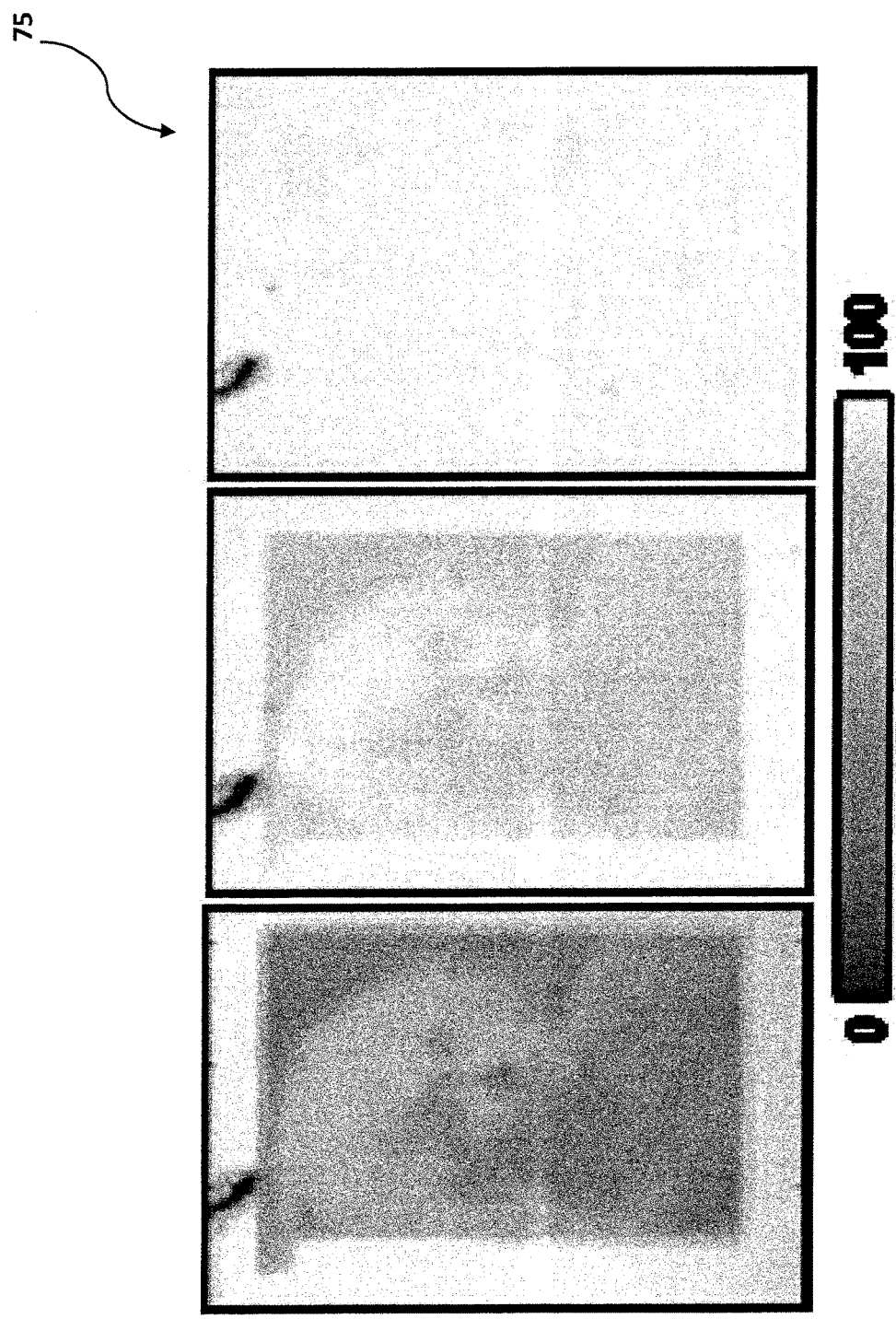
FIG. 4C are Fourier-transform infrared (FTIR) scan generated images of the plasmonic surface acquired for semiconducting (Left, T=295 K), phase separated (middle, T=320 K) and metallic (Right, T=360 K) states of $VO_2$, according to the present disclosure.

The device with 1000 nm thick spacer layer is of particular interest as it exhibits intensity modulation at the edge of the technologically relevant, IR transparent 8-14 μm band. FDTD simulations reveal that by simply increasing the hole diameter while keeping the period constant at 4 μm, it is possible to tune the absorption location across the gamut of the band. Furthermore, irrespective of the hole-diameter size, the reflectance (>80%) is found to be uniform across the band for metallic $VO_2$. FIG. 4A (diagram 70: IR transparent 8-14 μm band is enclosed with dashed rectangle) right shows the reflectance spectra for different hole diameters where a red shift is observed as the diameter is increased. This spectral tunability opens up the prospect of tunable multispectral operation on a pixelated surface such that each pixel is selectively sensitive to a wavelength of designer choice. Individual pixels can be made in compliance with the industry standard pixel size of sub 20 μm on a surface where reflectance from each pixel can be resolved by an IR detector. To demonstrate this, Applicant encoded Albert Einstein's image into a designer imprinted surface that functions as follows. The greyscale values of the image in visible domain are mapped to hole diameters of the absorber that encompass absorption across the 8-14 μm band. Therefore, it is possible to convey information from the visible to the IR domain by designating false IR "color" to each pixel based on the corresponding greyscale values in the visible image. The encoded image of Albert Einstein was fabricated using a combination of laser writing lithography and nanoimprint lithography as explained above. The hole diameters were varied by increasing the beam intensity during the laser write process and the pixel size was fixed to 12 μm. FIG. 4B (diagram 71) left shows the SEM images of the fabricated surface with different hole diameters that correspond to the absorption spectra as shown in FIG. 4A. Hyperspectral imaging of this IR encoded image was done using a mercury cadmium telluride (MCT) detector attached to a FTIR. The sample was mounted on an automated stage with in-plane translational capability. The FTIR spectrum for a single pixel was acquired at room temperature before translating to the adjacent pixel by a step of 12 μm. The acquired spectra for respective pixels were analyzed to obtain the IR coded Albert Einstein image as shown in FIG. 4C (diagram 75)—left. This clearly demonstrates the transfer of information from the visible to LWIR domain. Finally, we demonstrate that by heating the sample, at T=320 K, the image quality (FIG. 4C—middle) deteriorates when the absorption peak for respective hole diameters become less pronounced. Heating past the phase transition temperature of $VO_2$, at T=360 K, as the reflection from all the pixels simultaneously flatten to about 80%, the encoded information is successfully camouflaged (FIG. 4C—right). It is evident that Albert Einstein's image seamlessly blends into the background. A surface contamination was present on the top left corner of the image that remained unaffected throughout the experiment. The information can be recovered and camouflaged as desired by simply cycling though the phase transition in $VO_2$.

The power consumption for thermally cycling the device is estimated to be 1.275 mW/mm$^2$, which equates to a net consumption of 2.8 mW for the 1.3×1.7 mm$^2$ Albert Einstein image. Although the power requirement for the disclosed devices is less compared to previously reported $VO_2$ based systems,[14] Applicant speculates that the power consumption can be further reduced by inducing the SMT with an electric field instead of thermal cycling. The present device architecture can be modified by sandwiching the $VO_2$ layer between two transparent conducting oxides (TCO) layers. Therefore, an electric field[29] of ~25 kV/cm or 0.4 V can be applied across the TCO (40 nm)/$VO_2$ (150 nm)/TCO(40 nm) capacitive structure to induce the SMT in $VO_2$ and hence modulate the reflection spectra. This would reduce the net power consumption to 0.4 mW for the same Albert Einstein image. Furthermore, electric field induced SMT in $VO_2$ has been reported to occur in the timescale of microseconds,[29] which would enable ultrafast IR camouflage operation. Applicant envisions that the framework of this architecture can be combined with other patterns such as various metallic gratings,[38] 2D materials,[39] [40] etc., thereby paving the way for novel tunable optical devices in the IR domain.

In conclusion, Applicant takes advantage of the S-M phase transition in $VO_2$ to design an optical cavity coupled IR absorber where the cavity length can be altered by controlling the VO$_2$ phase. Cavity tuning is done by strategically placing the VO$_2$ layer inside the optical cavity that is composed of a tri-layer architecture. In its semiconducting state VO$_2$ is transparent to IR such that incident light couples to the entire cavity length, however in the metallic state, VO$_2$ behaves like a mirror and shortens the cavity length by isolating the SiO$_2$ layer from the system. The temperature dependent permittivity of VO$_2$ is calculated using two effective medium models by accounting for the semiconductor/metal phase co-existence. The analysis reveals that the Maxwell Garnett EMT describes the phase transition dependent optical response of the absorber better than the Bruggeman EMT when compared to the experimental results. Applicant shows that the optical response of the system can be controlled by tweaking the design of the plasmonic crystal, i.e. hole/disk diameter and/or periodicity. In addition, the relative thicknesses of the constituent layers in the optical cavity can be optimized to tailor the IR response of the system between the two states of VO$_2$. Finally, multi-spectral operation of the system is demonstrated, where active IR information camouflage is achieved by heating VO$_2$ across the SMT. Applicant has demonstrated this by actively controlling the reflection from a device which has the image of Albert Einstein encoded on its pixelated surface with a pixel resolution and density comparable to the industry standard for IR sensors. The versatile design allows operation in any domain from MWIR to LWIR with proper choice of the device parameters, which makes it viable for a plethora of applications in optics and communication that necessitate active tuning.

Figure 5A:
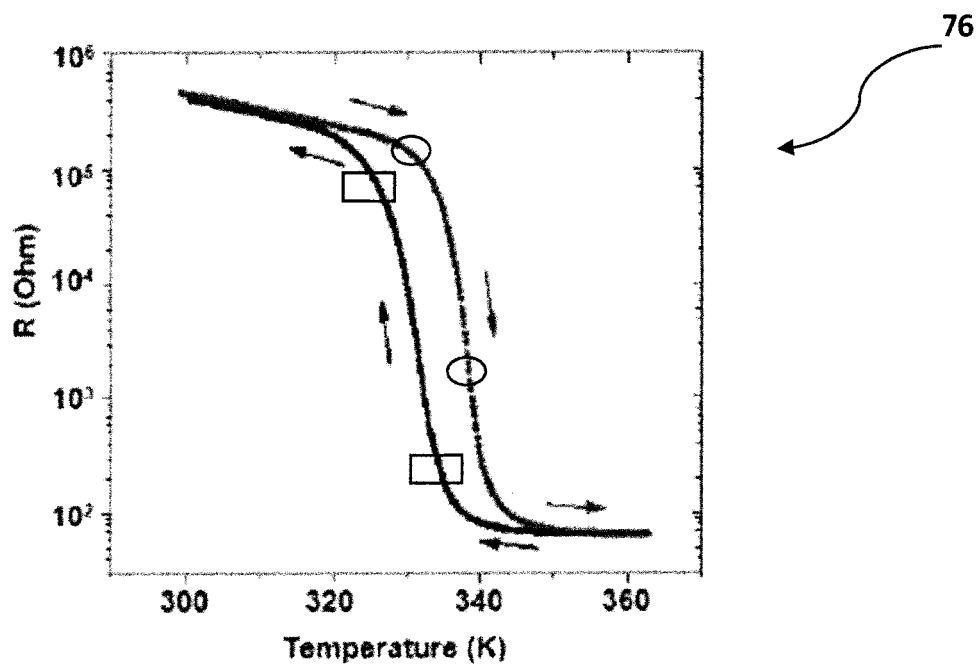
FIGS. 5A-5B are diagrams, respectively, of temperature dependence of resistance for 150 nm $VO_2$ film while heating and cooling, and FDTD simulated (dashed) and FTIR measured (solid) reflectance of $VO_2$ film in semiconducting and metallic states.
Figure 5B:
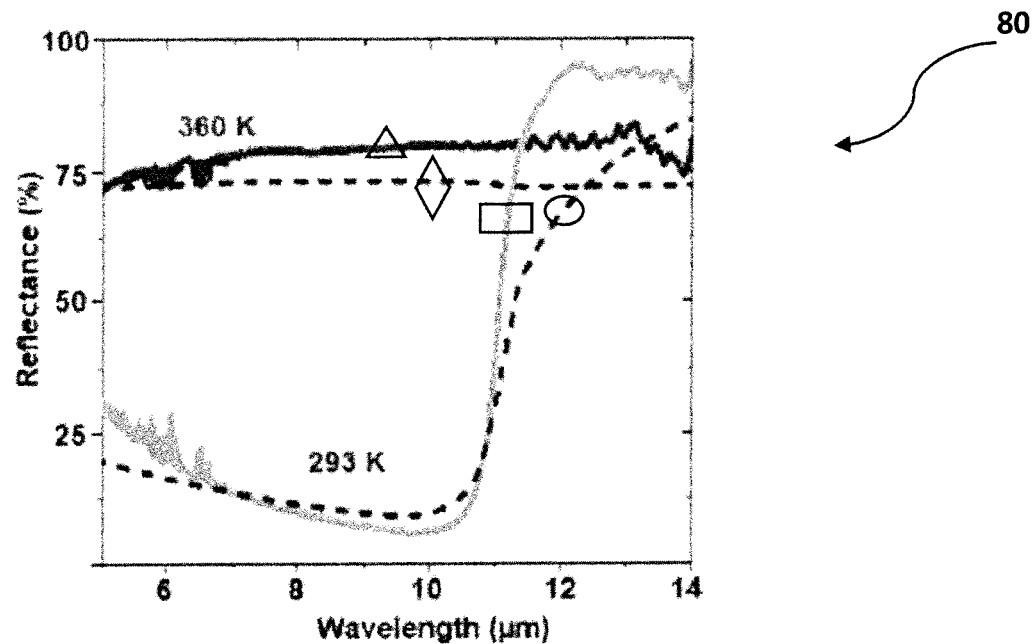
Figure 6A:
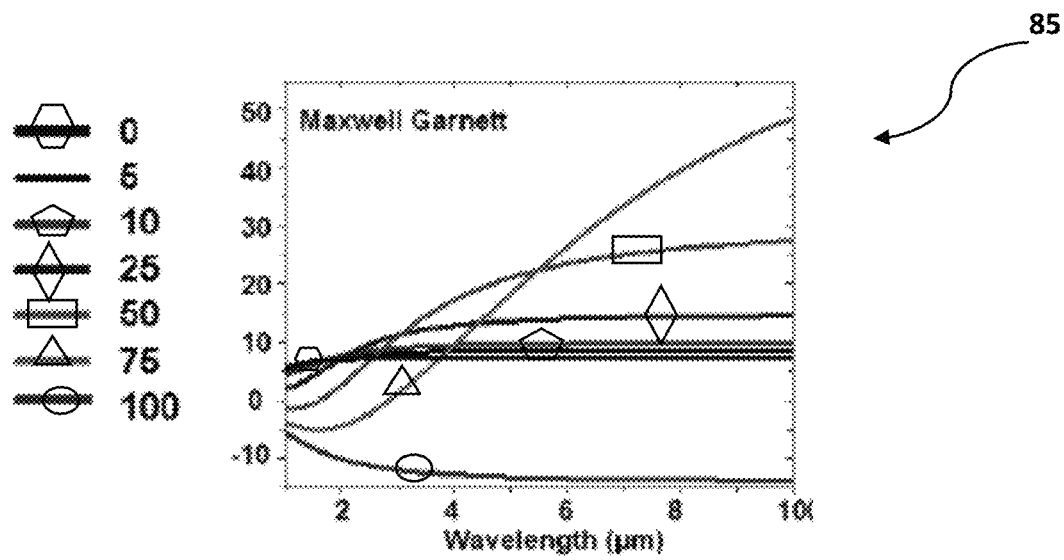
FIGS. 6A-6D are diagrams, respectively, of real and imaginary components of $VO_2$ permittivity calculated using the Maxwell Garnett effective medium model, real and imaginary components of $VO_2$ permittivity calculated using the Bruggeman effective medium model, real and imaginary components of $VO_2$ permittivity calculated using the Maxwell Garnett effective medium model, and real and imaginary components of $VO_2$ permittivity calculated using the Bruggeman effective medium model.
Figure 6B:
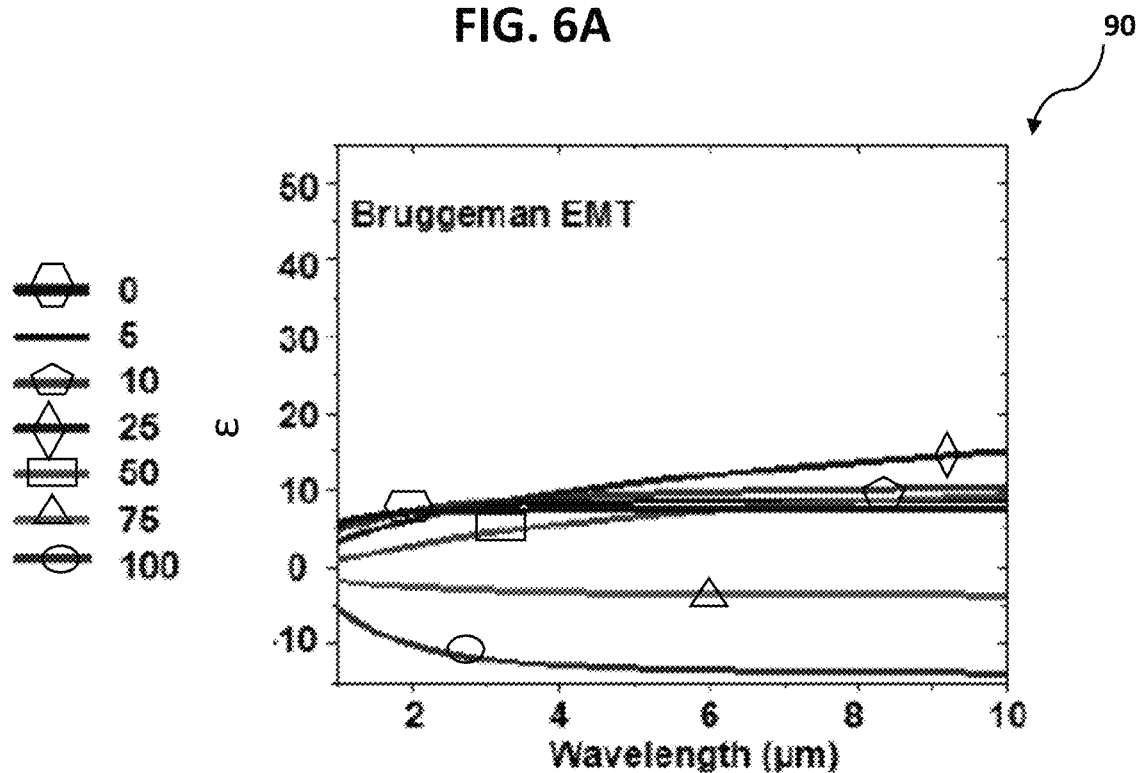
Figure 6C:
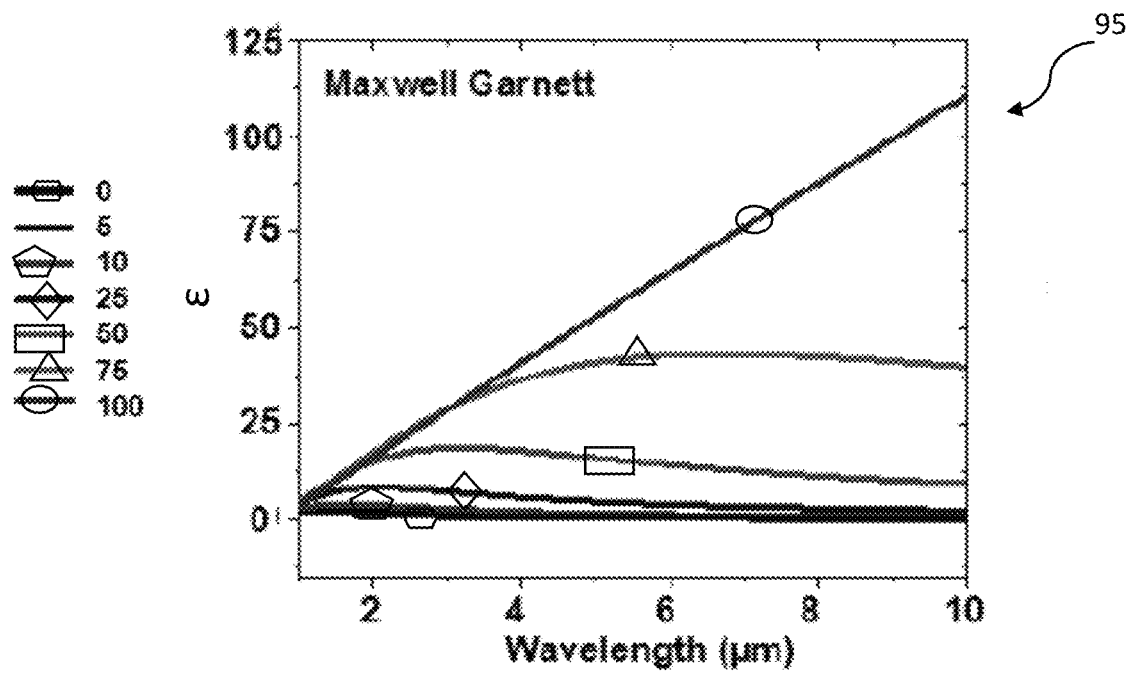
Figure 6D:
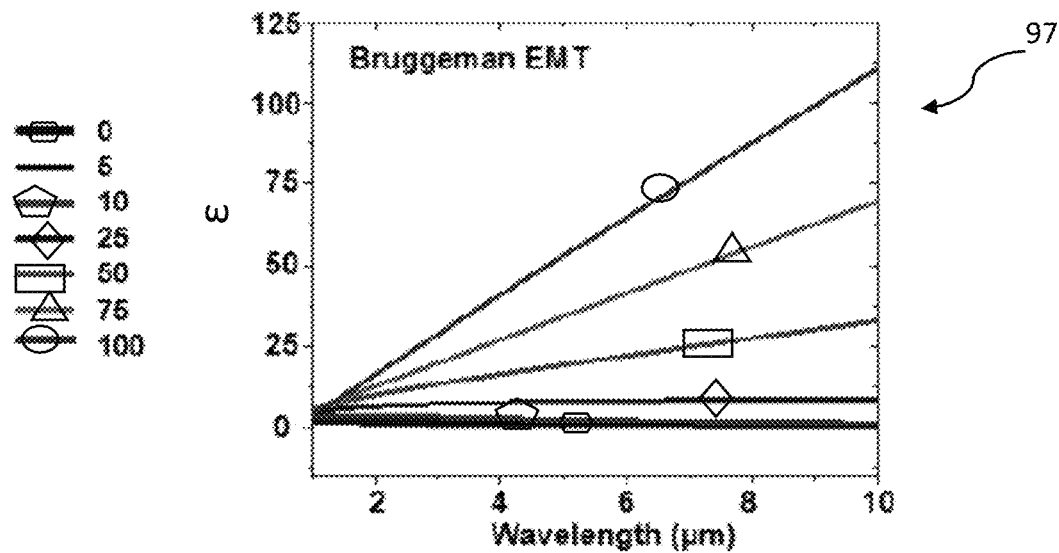

VO$_2$ film deposition: VO$_2$ films were deposited by reactive RF magnetron sputtering using a 99.99% purity vanadium metal target. The VO$_2$ films were deposited at 400° C. in a gas mixture of Ar+O$_2$ and pressure of 10 mtorr in an AJA system. The oxygen partial pressure was varied from 2 to 5%. The optimally deposited VO$_2$ film (thickness 150 nm) on Al$_2$O$_3$ substrate exhibited a 4 orders of magnitude change in resistance at the S-M transition temperature of 343 K (FIGS. 5A-5B: diagrams 76, 80; temperature dependence of resistance for 150 nm VO$_2$ film while heating (oval marked) and cooling (rectangle marked). FDTD simulated (dashed) and FTIR measured (solid) reflectance of VO2 film in semiconducting and metallic states.). In addition, the reflectance spectra of the VO$_2$ film measured at 293 K and 360 K showed excellent agreement with FDTD simulation (FIGS. 5A-5B).

Device Fabrication

The entire absorber fabrication involved the following steps. The Au mirror and SiO$_2$ layers were successively electron beam evaporated followed by deposition of the VO$_2$ layer. Subsequently a layer of SU-8 was spun-coated and nanoimprint lithography was done to form the coupled hole-disk metasurface that was coated with a 30 nm Au film to complete the structure.

Figure 7:
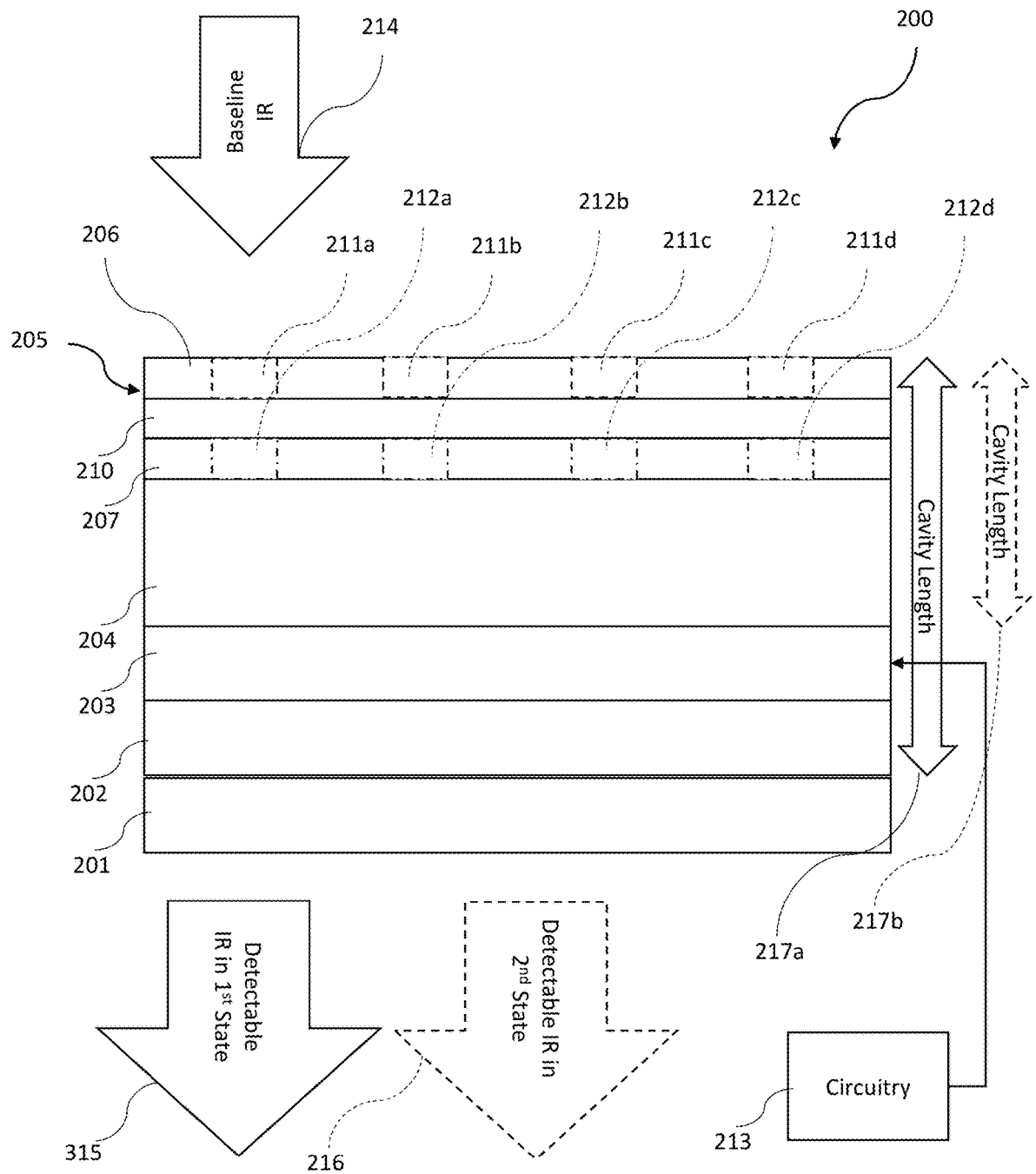
FIG. 7 is a schematic diagram of an active IR camouflage device, according to the present disclosure.

Referring now to FIG. 7, a plasmonic system 200 with tunable cavity length operating in an IR frequency spectrum is now described. As will be appreciated, one of the exemplary applications for the plasmonic system 200 is an active IR camouflage device 200, which is illustrated in FIG. 7. It should be appreciated that the plasmonic system 200 could be used in other applications.

The active IR camouflage device 200 illustratively includes a base layer 201, and a first dielectric layer 202 over the base layer. The first dielectric layer 202 may comprise silicon dioxide, for example. The base layer 201 may comprise glass, sapphire, or quartz, for example.

The active IR camouflage device 200 comprises a phase transition material layer 203 over the first dielectric layer 202, and a second dielectric layer 204 over the phase transition material layer 203. The phase transition material layer 203 may comprise vanadium dioxide. In particular, any material with the desired controllable phase transition and IR performance can be used.

The active IR camouflage device 200 comprises a first metal layer 205 over the second dielectric layer 204 and defining a pattern of openings therein. More specifically, the first metal layer 205 comprises an upper layer 206, a lower layer 207 adjacent the second dielectric layer 204, and a medial layer 210 between the upper layer and the lower layer. The pattern of openings illustratively comprises a plurality of openings 211a-211d in the upper layer 206, and a plurality of discs 212a-212d in the lower layer 207. The plurality of openings 211a-211d is aligned to respectively overlap the plurality of discs 212a-212d.

The plurality of openings 211a-211d and plurality of discs 212a-212d may each be circle-shaped in some embodiments (FIG. 1A). In other embodiments, the plurality of openings 211a-211d and plurality of discs 212a-212d may each be hexagon-shaped. Of course, these are exemplary embodiments and other shapes are possible, such as other polygons.

The lower and upper layers 206, 207 of the first metal layer 205 may comprise at least one of gold, silver, aluminum, and an electrically conductive material. The medial layer 210 may comprise a dielectric material (e.g. polymer, such as SU-8) suitable for transparence in the IR range and permitting formation of the upper layer 206 thereon.

The active IR camouflage device 200 illustratively includes circuitry 213 configured to selectively cause a transition from a first phase state to a second phase state of the phase transition material layer 203 to control IR reflectance of the phase transition material layer. For example, in embodiments where the phase transition material layer 203 comprises vanadium dioxide, the circuitry 213 is configured to change the temperature of the vanadium dioxide to cause the desired phase state change. The first phase state comprises a semiconductor state, and the second phase state comprises a metal phase state.

As shown, the active IR camouflage device 200 is subject to a baseline IR level 214 incident upon an optical cavity 217a-217b of the device. For some exemplary applications, the baseline IR level 214 is the emitting IR level of an object under the active IR camouflage device 200. When the phase transition material layer 203 is in the first phase state, the first dielectric layer 202, the phase transition material layer, the second dielectric layer 204, and the first metal layer 205 define the optical cavity 217a. In the first state, the phase transition material layer 203 is transparent or near transparent (i.e. 90% transparent or passing incident IR radiation±10%) to radiation in the IR range.

In the first state, the active IR camouflage device 200 has a first detectable IR level 215, which is associated with the baseline IR level 214. In particular, the first detectable IR level 215 and the first detectable IR level 215 are substantially equivalent (i.e. 100% equivalent±20%).

When the phase transition material layer 203 is in the second phase state, the second dielectric layer 204, and the first metal layer 205 define the optical cavity 217b. In other words, the active IR camouflage device 200 has a tunable length optical cavity. In the second state, the phase transition material layer 203 is reflective or near reflective (i.e. 90% reflecting to incident IR radiation±10%) to radiation in the IR range (i.e. acting as a mirror). In the second state, the active IR camouflage device 200 has a second detectable IR level 216 (shown with dashed lines). In particular, the second detectable IR level 216 is less than the first detectable IR level 215. In other words, the active IR camouflage device 200 is masking the baseline IR level 214.

As discussed hereinabove, the performance and operational characteristics of the active IR camouflage device 200 can be selectively changed based upon structural parameters. In particular, these structural parameters include the spacing and shape of the plurality of openings 211a-211d and plurality of discs 212a-212d, the thickness of the first metal layer 205, the thickness of the second dielectric layer 204, the thickness of the medial layer 210, and the materials selected for the first metal layer, the first and second dielectric layers 202, 204, and the phase transition material layer 203.

Figure 9:
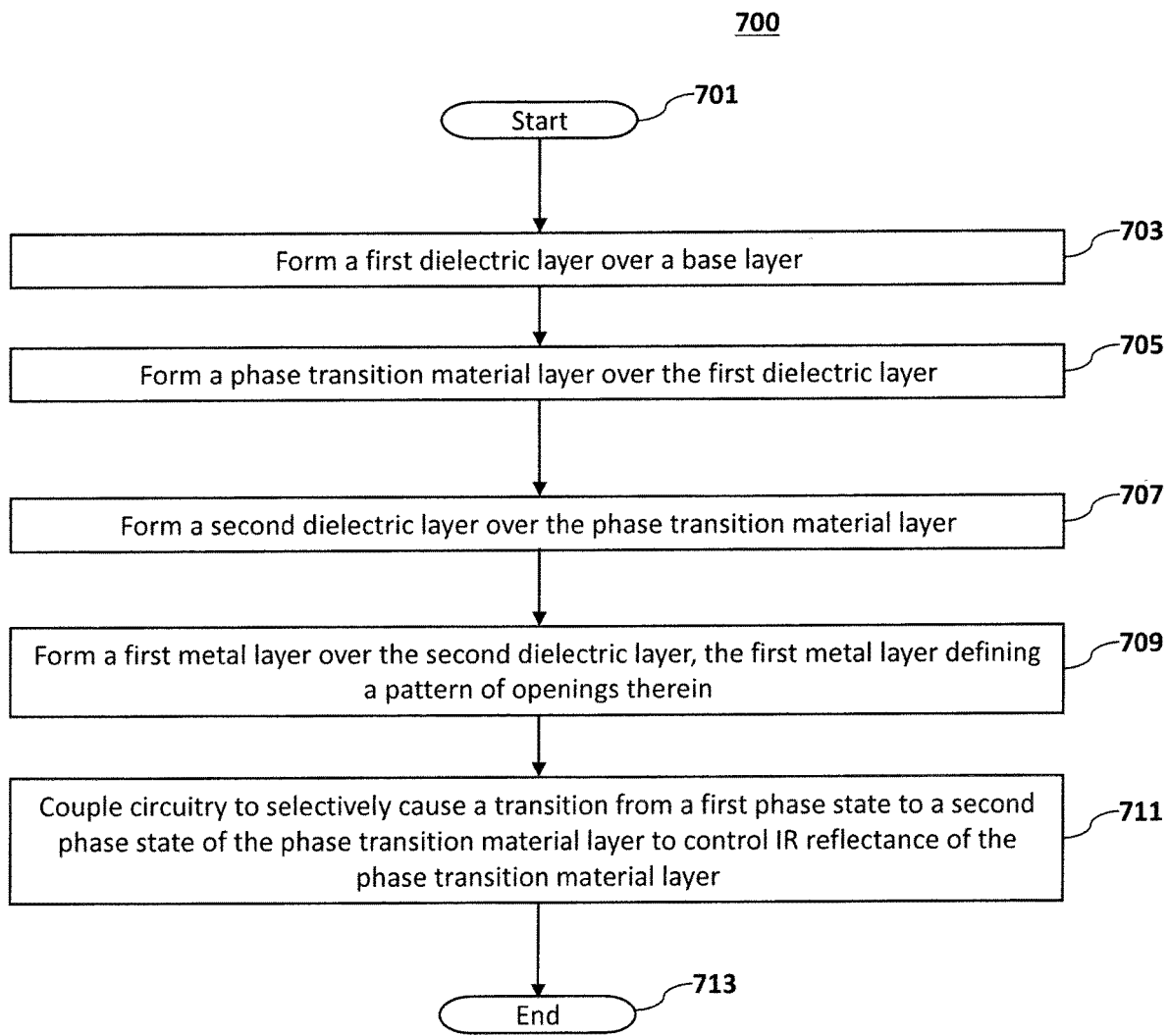
FIG. 9 is a flowchart for a method of making the active IR camouflage device, according to the present disclosure.

Referring now to FIG. 9 and a flowchart 700, a method for making the active IR camouflage device 200 is now described, which begins at Block 701. The method comprises forming a first dielectric layer 202 over a base layer 201 (Block 703), forming a phase transition material layer 203 over the first dielectric layer (Block 705), forming a second dielectric layer 204 over the phase transition material layer (Block 707), and forming a first metal layer over the second dielectric layer (Block 709). The first metal layer 205 defines a pattern of openings 211a-211d, 212a-212d therein. The method includes coupling circuitry 213 to selectively cause a transition from a first phase state to a second phase state of the phase transition material layer 203 to control IR reflectance of the phase transition material layer (Blocks 711, 713).

Figure 10:
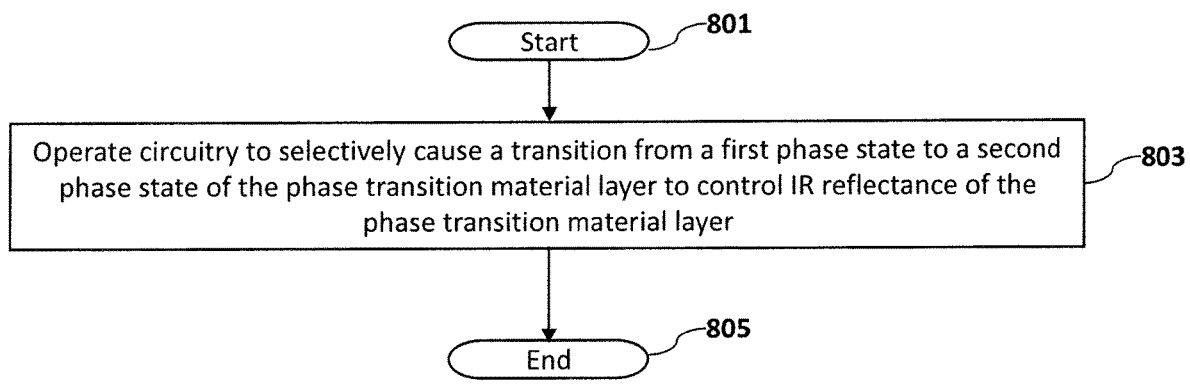
FIG. 10 is a flowchart for a method of operating the active IR camouflage device, according to the present disclosure.

Referring now to FIG. 10 and a flowchart 800, a method for operating an active IR camouflage device 200 is now described, which begins at Block 801. The IR camouflage device 200 has a base layer 201, a first dielectric layer 202 over the base layer, a phase transition material layer 203 over the first dielectric layer, a second dielectric layer 204 over the phase transition material layer, and a first metal layer 205 over the second dielectric layer and defining a pattern of openings 211a-211d, 212a-212d therein. The method includes operating circuitry 213 to selectively cause a transition from a first phase state to a second phase state of the phase transition material layer 203 to control IR reflectance of the phase transition material layer (Blocks 803, 805).

Figure 8:
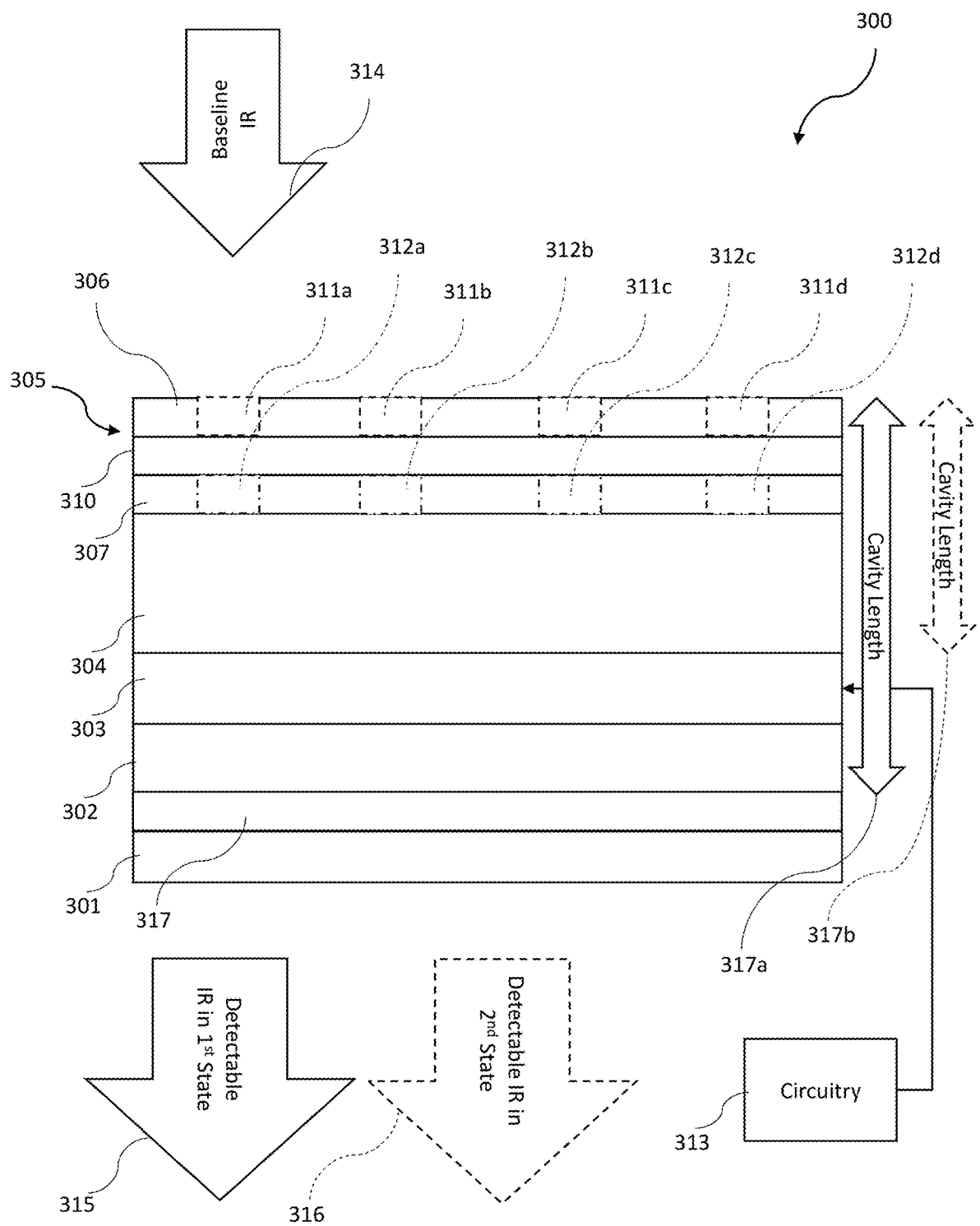
FIG. 8 is a schematic diagram of another embodiment of the active IR camouflage device, according to the present disclosure.

Referring now additionally to FIG. 8, another embodiment of the active IR camouflage device 300 is now described. In this embodiment of the active IR camouflage device 300, those elements already discussed above with respect to FIG. 7 are incremented by 100 and most require no further discussion herein. This embodiment differs from the previous embodiment in that this active IR camouflage device 300 illustratively includes a second metal layer 317 between the base layer 301 and the first dielectric layer 302. The second metal layer 317 may comprise at least one of gold, silver, aluminum, and an electrically conductive material.

In this embodiment, wherein when the phase transition material layer 303 is in the first phase state, the first dielectric layer 302, the phase transition material layer, the second dielectric layer 304, the first patterned metal layer 305 and the second bottom metal layer 317 define an optical cavity. When the phase transition material layer 303 is in the second phase state, the first patterned metal layer 305, the second dielectric layer 304, and the phase transition material layer 303 define the optical cavity, i.e. the optical cavity is shortened by removing the first dielectric layer 302 and the second metal layer 317.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

REFERENCES (ALL INCORPORATED BY REFERENCE IN THEIR ENTIRETY)

[1] M. Hirota, Y. Nakajima, M. Saito, M. Uchiyama, Advanced Microsystems for Automotive Applications 2004 2004, 63.
[2] A. Jain, A. Banerjee, Proc Spie 2016, 9881.
[3] A. Hashemi, Enrgy Proced 2017, 134, 815.
[4] M. Dirnwoeber, R. Machan, J. Herler, Remote Sens-Basel 2012, 4, 3346.
[5] H. M. Heise, J. Fritzsche, H. Tkatsch, F. Waag, K. Karch, K. Henze, S. Delbeck, J. Budde, Eur J Phys 2013, 34, 5139.
[6] M. S. Long, A. Y. Gao, P. Wang, H. Xia, C. Ott, C. Pan, Y. J. Fu, E. F. Liu, X. S. Chen, W. Lu, T. Nilges, J. B. Xu, X. M. Wang, W. D. Hu, F. Miao, Sci Adv 2017, 3, e1700589.
[7] A. Tebo, Las Focus-Electro-Op 1984, 20, 46.
[8] A. Rogalski, P. Martyniuk, M. Kopytko, Rep Prog Phys 2016, 79, 046501.
[9] X. Y. Liu, W. J. Padilla, Adv Mater 2016, 28, 871.
[10] X. Y. Liu, W. J. Padilla, Int Conf Optic Mems 2015, WOS:000380513000031.
[11] Y. L. Tian, X. A. Zhang, S. L. Dou, L. P. Zhang, H. M. Zhang, H. M. Lv, L. L. Wang, J. P. Zhao, Y. Li, Sol Energ Mat Sol C 2017, 170, 120.
[12] A. Schwarz, Target and Background Signatures 2015, 9653, 965306.
[13] L. Yang, P. H. Zhou, T. X. Huang, G. S. Zhen, L. Zhang, L. Bi, X. L. Weng, J. L. Xie, L. J. Deng, Opt Mater Express 2017, 7, 2767.
[14] L. Xiao, H. Ma, J. K. Liu, W. Zhao, Y. Jia, Q. Zhao, K. Liu, Y. Wu, Y. Wei, S. S. Fan, K. L. Jiang, Nano Lett 2015, 15, 8365.
[15] Z. P. Mao, W. Wang, Y. Liu, L. P. Zhang, H. Xu, Y. Zhong, Thin Solid Films 2014, 558, 208.
[16] C. Y. Xu, G. T. Stiubianu, A. A. Gorodetsky, Science 2018, 359, 1495.
[17] A. Vazquez-Guardado, A. Safaei, S. Modak, D. Franklin, D. Chanda, Phys Rev Lett 2014, 113, 263902.
[18] F. Xu, X. Cao, J. T. Zhu, G. Y. Sun, R. Li, S. W. Long, H. J. Luo, P. Jin, Mater Lett 2018, 222, 62.
[19] A. Tittl, A. K. U. Michel, M. Schaferling, X. H. Yin, B. Gholipour, L. Cui, M. Wuttig, T. Taubner, F. Neubrech, H. Giessen, Adv Mater 2015, 27, 4597.
[20] I. Slowik, N. M. Kronenberg, M. Franke, A. Fischer, A. Richter, M. C. Gather, K. Leo, Appl Phys Lett 2016, 109, 171104.
[21] P. Chandrasekhar, B. J. Zay, G. C. Birur, S. Rawal, E. A. Pierson, L. Kauder, T. Swanson, Adv Funct Mater 2002, 12, 95.
[22] E. M. Vinod, K. Ramesh, K. S. Sangunni, Sci Rep-Uk 2015, 5, 8050.

[23] M. A. Kats, R. Blanchard, S. Y. Zhang, P. Genevet, C. H. Ko, S. Ramanathan, F. Capasso, Phys Rev X 2013, 3, 041004.
[24] M. F. Jager, C. Ott, P. M. Kraus, C. J. Kaplan, W. Pouse, R. E. Marvel, R. F. Haglund, D. M. Neumark, S. R. Leone, P Natl Acad Sci USA 2017, 114, 9558.
[25] K. Appavoo, D. Y. Lei, Y. Sonnefraud, B. Wang, S. T. Pantelides, S. A. Maier, R. F. Haglund, Nano Lett 2012, 12, 780.
[26] A. Moatti, R. Sachan, J. Prater, J. Narayan, Acs Appl Mater Inter 2017, 9, 24298.
[27] A. Crunteanu, J. Givernaud, J. Leroy, D. Mardivirin, C. Champeaux, J. C. Orlianges, A. Catherinot, P. Blondy, Sci Technol Adv Mat 2010, 11, 065002.
[28] J. Givernaud, A. Crunteanu, J. C. Orlianges, A. Pothier, C. Champeaux, A. Catherinot, P. Blondy, Ieee T Microw Theory 2010, 58, 2352.
[29] N. Shukla, A. Parihar, E. Freeman, H. Paik, G. Stone, V. Narayanan, H. Wen, Z. Cai, V. Gopalan, R. Engel-Herbert, D. G. Schlom, A. Raychowdhury, S. Datta, Sci Rep-Uk 2014, 4, 4964.
[30] D. Chanda, K. Shigeta, T. Truong, E. Lui, A. Mihi, M. Schulmerich, P. V. Braun, R. Bhargava, J. A. Rogers, Nat Commun 2011, 2, 479.
[31] H. S. Choi, J. S. Ahn, J. H. Jung, T. W. Noh, D. H. Kim, Phys Rev B 1996, 54, 4621.
[32] A. S. Barker, H. W. Verleur, H. J. Guggenheim, Phys Rev Lett 1966, 17, 1286.
[33] A. Vazquez-Guardado, D. Chanda, Phys Rev Lett 2018, 120, 137601.
[34] P. U. Jepsen, B. M. Fischer, A. Thoman, H. Helm, J. Y. Suh, R. Lopez, R. F. Haglund, Phys Rev B 2006, 74, 205103.
[35] D. Franklin, Y. Chen, A. Vazquez-Guardado, S. Modak, J. Boroumand, D. M. Xu, S. T. Wu, D. Chanda, Nat Commun 2015, 6, 7337.
[36] D. Chanda, K. Shigeta, S. Gupta, T. Cain, A. Carlson, A. Mihi, A. J. Baca, G. R. Bogart, P. Braun, J. A. Rogers, Nat Nanotechnol 2011, 6, 402.
[37] S. Modak, A. Safaei, D. Chanda, in ArXiv e-prints, 2017, arXiv:1710.00392.
[38] R. Ameling, H. Giessen, Laser Photonics Rev 2013, 7, 141.
[39] A. Safaei, S. Chandra, A. Vazquez-Guardado, J. Calderon, D. Franklin, L. Tetard, L. Zhai, M. N. Leuenberger, D. Chanda, Phys Rev B 2017, 96, 165431.
[40] Y. Li, Z. W. Li, C. Chi, H. Y. Shan, L. H. Zheng, Z. Y. Fang, Adv Sci 2017, 4, 1600430.

That which is claimed is:

1. An active infrared (IR) camouflage device comprising:
a base layer;
a first dielectric layer over said base layer;
a phase transition material layer over said first dielectric layer;
a second dielectric layer over the phase transition material layer;
a first metal layer over said second dielectric layer and defining a pattern of openings therein; and
circuitry configured to selectively cause a transition from a first phase state to a second phase state of said phase transition material layer to control IR reflectance of said phase transition material layer.

2. The active IR camouflage device of claim 1 wherein said first metal layer comprises an upper layer, and a lower layer adjacent said second dielectric layer; and wherein said pattern of openings comprises a plurality of openings in said upper layer, and a plurality of discs in said lower layer.

3. The active IR camouflage device of claim 2 wherein said plurality of openings is aligned to respectively overlap said plurality of discs.

4. The active IR camouflage device of claim 1 wherein the first phase state comprises a semiconductor state; and wherein the second phase state comprises a metal phase state.

5. The active IR camouflage device of claim 1 wherein when the phase transition material layer is in the first phase state, said first dielectric layer, said phase transition material layer, said second dielectric layer, and said first metal layer define an optical cavity; and wherein when the phase transition material layer is in the second phase state, said second dielectric layer, and said first metal layer define the optical cavity.

6. The active IR camouflage device of claim 1 further comprising a second metal layer between said base layer and said first dielectric layer.

7. The active IR camouflage device of claim 1 wherein said base layer comprises a glass layer.

8. The active IR camouflage device of claim 1 wherein said phase transition material layer comprises vanadium dioxide.

9. The active IR camouflage device of claim 1 wherein said first metal layer comprises at least one of gold, silver, aluminum, and an electrically conductive material.

10. A plasmonic system with tunable cavity length operating in an infrared (IR) frequency spectrum, the plasmonic system comprising:
a base layer;
a first dielectric layer over said base layer;
a phase transition material layer over said first dielectric layer;
a second dielectric layer over the phase transition material layer;
a first metal layer over said second dielectric layer and defining a pattern of openings therein; and
circuitry configured to selectively cause a transition from a first phase state to a second phase state of said phase transition material layer to control IR reflectance based upon the tunable cavity length.

11. The plasmonic system of claim 10 wherein said first metal layer comprises an upper layer, and a lower layer adjacent said second dielectric layer; and wherein said pattern of openings comprises a plurality of openings in said upper layer, and a plurality of discs in said lower layer.

12. The plasmonic system of claim 11 wherein said plurality of openings is aligned to respectively overlap said plurality of discs.

13. The plasmonic system of claim 10 wherein the first phase state comprises a semiconductor state; and wherein the second phase state comprises a metal phase state.

14. The plasmonic system of claim 10 wherein when the phase transition material layer is in the first phase state, said first dielectric layer, said phase transition material layer, said second dielectric layer, and said first metal layer define an optical cavity; and wherein when the phase transition material layer is in the second phase state, said second dielectric layer, and said first metal layer define the optical cavity.

15. The plasmonic system of claim 10 further comprising a second metal layer between said base layer and said first dielectric layer.

16. The plasmonic system of claim 10 wherein said base layer comprises a glass layer.

17. The plasmonic system of claim 10 wherein said phase transition material layer comprises vanadium dioxide; and wherein said first metal layer comprises at least one of gold, silver, aluminum, and an electrically conductive material.

18. A method for making an active infrared (IR) camouflage device, the method comprising:
forming a first dielectric layer over a base layer;
forming a phase transition material layer over the first dielectric layer;
forming a second dielectric layer over the phase transition material layer;
forming a first metal layer over the second dielectric layer, the first metal layer defining a pattern of openings therein; and
coupling circuitry to selectively cause a transition from a first phase state to a second phase state of the phase transition material layer to control IR reflectance of the phase transition material layer.

19. The method of claim 18 wherein the first metal layer comprises an upper layer, and a lower layer adjacent the second dielectric layer; and wherein the pattern of openings comprises a plurality of openings in the upper layer, and a plurality of discs in the lower layer.

20. The method of claim 19 wherein the plurality of openings is aligned to respectively overlap the plurality of discs.

21. A method for operating an active infrared (IR) camouflage device comprising a base layer, a first dielectric layer over the base layer, a phase transition material layer over the first dielectric layer, a second dielectric layer over the phase transition material layer, and a first metal layer over the second dielectric layer and defining a pattern of openings therein, the method comprising:
operating circuitry to selectively cause a transition from a first phase state to a second phase state of the phase transition material layer to control IR reflectance of the phase transition material layer.

22. The method of claim 21 wherein the first metal layer comprises an upper layer, and a lower layer adjacent the second dielectric layer; and wherein the pattern of openings comprises a plurality of openings in the upper layer, and a plurality of discs in the lower layer.

23. The method of claim 22 wherein the plurality of openings is aligned to respectively overlap the plurality of discs.

* * * * *